United States Patent [19]
Fairman et al.

[11] Patent Number: 4,849,875
[45] Date of Patent: Jul. 18, 1989

[54] COMPUTER ADDRESS MODIFICATION SYSTEM WITH OPTIONAL DMA PAGING

[75] Inventors: Bruce A. Fairman, Woodside; Allen J. Larsen, Campbell; William G. Swinton; Robert G. Taylor, Jr., both of Santa Cruz, all of Calif.

[73] Assignee: Tandon Corporation, Moorpark, Calif.

[21] Appl. No.: 84,318

[22] Filed: Aug. 10, 1987

Related U.S. Application Data

[63] Continuation-in-part of Ser. No. 20,964, Mar. 3, 1987.

[51] Int. Cl.⁴ .................. G06F 9/36; G06F 13/00; G06F 13/28
[52] U.S. Cl. ............................. 364/200; 364/242.3; 364/255; 364/242.31
[58] Field of Search ... 364/200 MS File, 900 MS File; 365/235

[56] References Cited

U.S. PATENT DOCUMENTS

| | | | |
|---|---|---|---|
| 3,970,999 | 7/1976 | Elward | 364/200 |
| 4,158,227 | 6/1979 | Baxter et al. | 364/200 |
| 4,164,786 | 8/1979 | Gollomp | 364/200 |
| 4,340,932 | 7/1982 | Bakula et al. | 364/200 |
| 4,383,296 | 5/1983 | Sander | 364/200 |
| 4,386,402 | 5/1983 | Toy | 364/200 |
| 4,403,282 | 9/1983 | Holberger et al. | 364/200 |
| 4,403,283 | 9/1983 | Myntti et al. | 364/200 |
| 4,407,016 | 9/1983 | Bayliss et al. | 364/200 |
| 4,419,727 | 12/1983 | Holtey et al. | 364/200 |
| 4,449,181 | 5/1984 | Young et al. | 364/200 |
| 4,449,184 | 5/1984 | Pohlman, III et al. | 364/200 |
| 4,550,368 | 10/1985 | Bechtolsheim | 364/200 |
| 4,669,043 | 5/1987 | Kaplinsky | 364/200 |
| 4,669,064 | 5/1987 | Ishimoto | 365/189 |
| 4,675,850 | 7/1987 | Kumanoya et al. | 365/230 |
| 4,688,166 | 8/1987 | Schneider | 364/200 |
| 4,697,106 | 9/1987 | Watanabe | 307/463 |
| 4,740,922 | 4/1988 | Ogawa | 365/189 |

FOREIGN PATENT DOCUMENTS 55-44613  3/1980  Japan ........................... 364/200

OTHER PUBLICATIONS

Technical Reference Manual—IBM PC AT, Version 1.0, Mar. 1984, Sections I–VI.
Victor VI Memory Mapper System Interface Description, NNA Corporation, 1985, Section VI.
Expanded Memory Device Specification (3.0), Intel.
IBM Technical Disclosure Bulletin, vol. 25, No. 7B, Dec. 1982, p. 3865.

Primary Examiner—Archie E. Williams, Jr.
Assistant Examiner—Ayni Mohamed
Attorney, Agent, or Firm—Scherlacher, Mok & Roth

[57] ABSTRACT

A computer system includes a computer address modification system that is advantageously coupled in a bus network to selectively translate memory address data in 16K blocks and provide DMA page addresses in 16K blocks which may match the 16K memory address blocks. The modification system includes a mapping RAM selectively providing translated addresses to enable addresses in a 16 megabyte extended address space. The modification system also includes a page register storing for each addressable 16K block of data for each DMA channel a page address within the extended address space.

20 Claims, 13 Drawing Sheets

PAGE REG

COMPUTER ADDRESS MODIFICATION SYSTEM WITH OPTIONAL DMA PAGING

CROSS REFERENCE TO RELATED APPLICATION

This application is a continuation-in-part of U.S. Ser. No. 020,964, filed Mar. 3, 1987.

BACKGROUND OF THE INVENTION

A designer of a data processing system or computer has typically had to accept a design compromise when selecting the maximum physical address space for the system. If a large address space is selected, the cost of the system is increased. Not only must the number of physical wires, drivers, connectors and related components be increased, but the address data size and storage requirements increase as well. For example, a 32 bit address requires twice the storage space of a 16 bit address. However, if the address space of a system is too limited, system performance will be degraded for complex operations which require quick access to a large amount of memory.

One solution to this problem has been to implement memory mapping or paging. In such an arrangement, a mapping memory or paging memory stores the most significant address bits for an expanded address space. For example, a system having a 20 bit address bus that can address 1 megabyte of memory might be used with a mapping memory that provides an additional 4 bits of addressing to accommodate a 16 megabyte address space. Certain locations in the original memory or I/O address space of the computer are reserved for accessing the mapping memory so that the stored most significant 4 address bits can be selectively changed. Once these bits are selected and written into the mapping memory, the computer can use its original address lines to address any location within a page or subset of the expanded memory that is defined by the most significant address bits stored in the mapping memory.

To increase the resolution of the page definitions the mapping memory can also store less significant address bits that overlap the original computer address bits. Typically, the overlapping mapper and computer address bits are added together to obtain the final extended memory space address.

The popular INTEL 8088 and 8086 microprocessors essentially use this technique. Each 20 bit output address is a sum of a 16 bit offset address and a 16 segment address that is shifted left 4 bit positions relative to the offset address. This enables most instructions to refer to one of 64K memory locations within a segment using a 16 bit offset address. At the same time, the segment boundaries can be changed by providing an additional 16 bit segment address to increase the total address space to one megabyte anytime it becomes necessary.

A more recent INTEL 80286 microprocessor is operable in a real mode which emulates the INTEL 8086 microprocessor or a protected mode which extends the address space from 1 megabyte to 16 megabytes. While price decreases for memory chips and increasing software complexity make it desirable to use the increased memory capacity, the protected mode in which the increased capacity is available is not compatible with the prior microprocessors. Software manufacturers have thus largely written software for the real mode to attain compatibility with the prior machines and maximize the available market size for their products. The extended memory capacity is generally used only for specialized applications such as a RAM disk which uses memory to simulate a disk drive.

The address modification system of the present invention provides memory access conversion functions which provide a window to an expanded memory space while operating in a real mode or a mode that is compatible therewith. The system provides a full function availability of the extended memory space, not only for memory word accesses, but for direct memory access (DMA) operations while retaining full compatibility with hardware interrupt processing.

SUMMARY OF THE INVENTION

A computer system in accordance with the invention includes a CPU, a bus controller, an I/O controller, a computer address modification system and I/O devices such as DMA controllers and interrupt controllers. An adaptive bus network connects the modification system within the computer system.

The modification system includes a mapper RAM, a page register and a control register which selectively enables the modification system and various modes of operation for the system. A 41 register page register provides selective page addressing for each possible 16K block of each DMA transfer channel.

BRIEF DESCRIPTION OF THE DRAWINGS

A better understanding of the invention may be had from a consideration of the following Detailed Description, taken in conjunction with the accompanying drawings in which.

DETAILED DESCRIPTION

Figure 1:
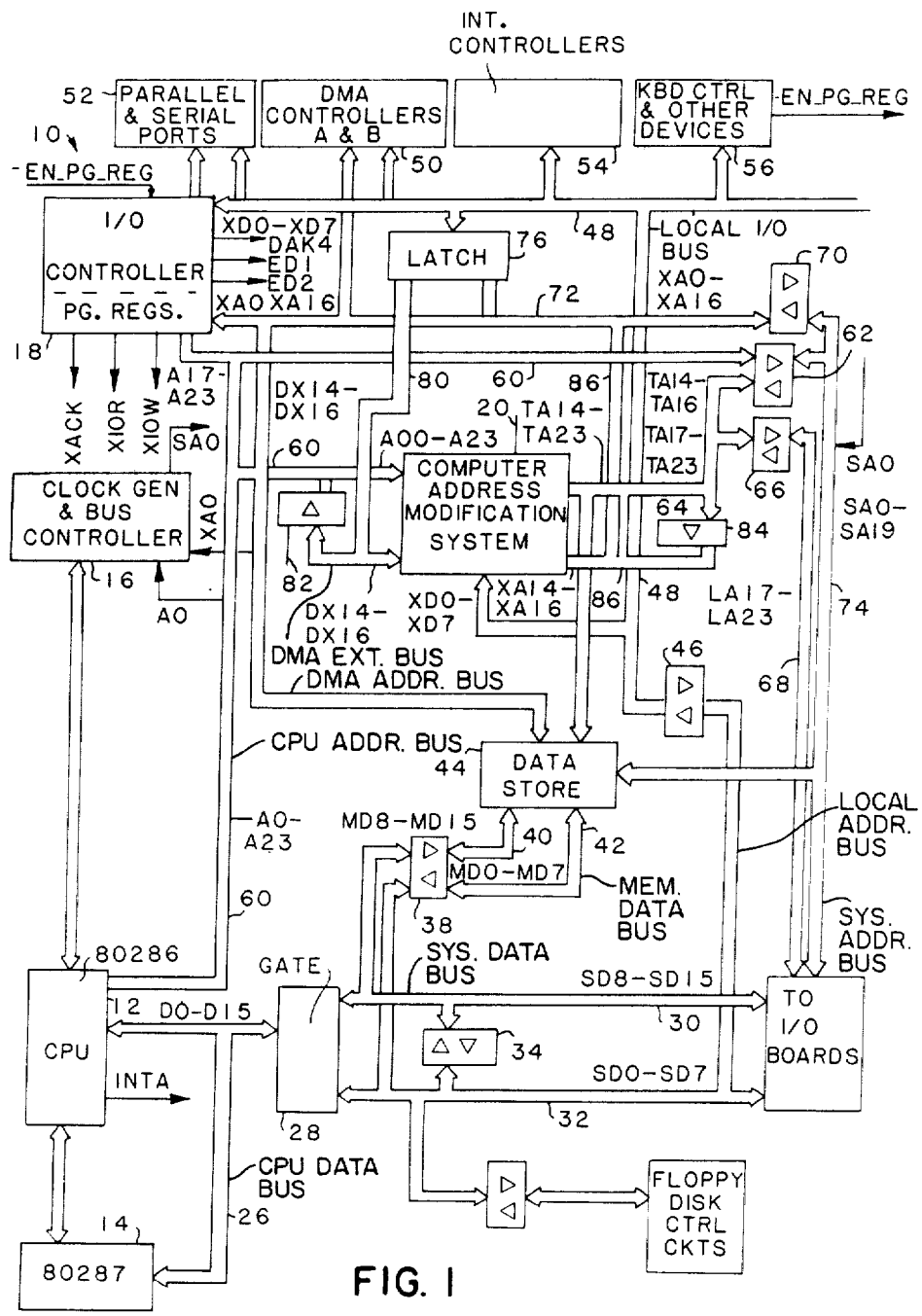
FIG. 1 is a block diagram representation of a computer system in accordance with the invention having a computer address modification system.

Referring now to FIG. 1, a computer system 10 in accordance with the invention is designed to provide compatibility with a popular PC AT computer system manufactured by International Business Machines, Incorporated. The computer system 10 includes an 80286 central processing unit 12, an 80287 math coprocessor 14 made by INTEL, a clock generator and bus controller 16, and an I/O controller 18.

Clock generator and bus controller 16 provides a nominal 8 MHz clock signal as well as numerous gating signals for enabling bus transfers within system 10. The detailed timing and control implementations of the system 10 are conventional. Thus, to facilitate understanding, only the significant data and address signal paths are shown in FIG. 1. However, the required control and gating signals should be implemented in a conventional manner to provide proper system operation.

Similarly the detailed circuitry and associated control and gating signals of I/O controller 18 have not been shown. These can be implemented in a conventional manner to provide proper input/output data transfers. I/O controller 18 incorporates the conventional IBM PC AT page registers.

The INTEL 80286 CPU 12 is operable in either a real mode or a protected mode. In real mode CPU 12 emulates an INTEL 80286 CPU and has an address space of 1 megabyte with the space above 640 kilobytes being reserved for ROM BIOS, video buffers and other system functions.

In protected mode the address space is increased to 16 megabytes but CPU 12 can no longer execute most software written for the 8086 and similar CPU's. To date it has thus been difficult to utilize the extended memory space except for a few specialized applications such as RAM disks which simulate actual disk drives while providing the speed of RAM.

The system 10 therefore includes a computer address modification system 20 which receives system addresses in the 1 megabyte address space and selectively translates these addresses in 16 kilobyte blocks to a 16 megabyte address space. The translation is transparent to operating programs and therefore maintains compatibility with programs written for the older CPU's. Modification system 20 provides for selective translation of DMA (direct memory address) operations in 16K blocks and selectively inhibits memory mapping upon processing a response routine for a nonmaskable interrupt (NMI) or a maskable interrupt. At turn on, system 20 operates in a clone mode in which a conventional real mode for the 80286 CPU 12 is implemented. However, by using conventional CPU I/O operations to write data into predetermined port locations, the modification system 20 can be operated in a mapping mode in which both CPU 20 memory accesses and DMA accesses are selectively transferred in 16K blocks from an address in 1 megabyte memory space to an address in 16 megabyte memory space on a 16K boundary.

Looking first at the system 10 data paths, the 16 bit CPU data bus 26 couples through a gate 28 to two upper and lower 8 bit system data buses, SD8-SD15 30 and SD0-SD7 32. A gate 34 allows data to be selectively transferred between the upper and lower data buses 30, 32.

A gate 38 couples the system data buses 30, 32 to corresponding memory data buses MD8-15 40 and MD0-7 42. Memory data buses 40, 42 in turn couple to a data store 44 which includes in a conventional manner, random access memory in the 0-640K memory space, BIOS ROM, and extended RAM in the extended 1M to 16M memory space.

System data bus 32 also couples through a gate 46 to a local I/O bus XD0-XD7 48 which connects to system 10 I/O devices including DMA controllers 50. Other devices connected to local I/O bus 48 may include parallel and serial ports 52, interrupt controllers 54 providing 7 levels of interrupt plus a nonmaskable interrupt, and a keyboard controller 56. Other devices such as a timer, or a real time clock may also be connected to the local I/O bus 48.

A CPU address bus A0-A23 couples to modification system 20 while the signal lines for lower order bits A0-A13 further couple to a gate 62. These lower bits define an address within a 16K block. Since address translation occurs in 16K blocks, these bits are not required to accomplish address modification and they can be coupled directly to gate 62.

Modification system 20 produces translated address portions in a translation address bus TA14-TA23 64 which couples to gate 62 as well as a gate 66. Gate 66 provides communication with a local address bus LA17-LA23 68 which provides communication with optional I/O system expansion boards.

Gate 62 provides communication with a system address bus SA0-SA19 74 which also couples to the I/O boards and through a gate 70 to a DMA address bus XA0-XA16 72. Signal SA0 is communicated from CPU bus 60 signal A0 through bus controller 16 so that it can be adjusted to accommodate swapping of a data byte between the upper and lower portions of the system data buses 30, 32.

Address positions XA14-XA16 must be handled specially because there are two types of DMA transfer operations. DMA channels 0, 1, 2 and 3 are byte channels that can access 64K bytes of data. Address bits 14 and 15 thus define 1 of 4 16K blocks within this space. DMA channels 4, 5 and 6 are word (2 byte) channels and can access 128K bytes of data. Address bits 14, 15 and 16 then define one of 8 16K blocks within the available address space.

A latch 76 receives data from local I/O data bus 48 and couples to local I/O address bus 72. Latch 76 also couples data bus 48 to a DMA extension bus DX14-DX16 80 which communicates DMA address data bits DX14-DX16 to modification system 20. A gate 82 selectively transfers address bits DX14-DX16 to CPU address lines A14-A16 for input to modification system 20. A gate 84 then transfers translated address signals TA14–TA16 back down to signal paths XA1-4–XA16 to be used as a DMA address on bus 86.

In clone mode all addresses are passed through modification system 20 without change and the system operates as a conventional 80286 processing system. However, once modification system 20 is switched to a mapping mode memory addresses are selectively translated in 16K blocks to any selected location in 16 megabyte memory space. Each different 16K block within the first megabyte may be individually translated to a different location. If the CPU operates in protected mode and asserts a CPU address above 1 megabyte, translation is automatically disabled. The modification system may be controlled to selectively disable mapping while the CPU processes an interrupt response routine. Separate repaging is provided for each 16K block for each different DMA channel. Individual paging for each 16K block may be selectively enabled or disabled for each DMA channel.

When the CPU accesses memory in clone (no translation) mode CPU address bus 60 carries bits A0–A13 through gate 62 to system address bus 74 and then to data store 44. The upper address bits A14–A24 pass through modification system 20 unchanged. Thy are output on translated address bus 64 for communication through gate 62 and system address bus 74 to data store 44. If mapper mode is enabled the address data path is essentially the same except that modification system 20 selectively changes address bus signals A14–A24.

When system control is granted to a DMA controller 50 I/O controller 18 generates signal −XACK and couples the DMA address from local I/O bus XA0–XA16 72 through gate 70 to system address bus 74. Bits DX14–DX16 are input directly to modification system 20 through bus 80 while bits AX1–AX13 are coupled through gate 70 to system address bus 74. The selectively modified address bits 14–16 are output on bus XA14–XA16 86 which connects to corresponding signals XA14–XA16 on bus 72. Address data is then coupled through gate 70 and system address bus 74 to data store 44.

Upon the occurrence of an interrupt an interrupt controller 54 places a vector type which defines an interrupt response vector address, onto the DMA data bus XD0–XD7. This vector type is then communicated to modification system 20 where it is stored. It is also made available to the CPU 12 through gate 46, system data bus 32 and CPU data bus 26. When CPU 12 responds to the interrupt request it places the vector type shifted left 2 bit positions as an address on the CPU address bus 60. When this bus input matches the vector type previously stored by modification system 20, translation of the interrupt vector type address is inhibited if this has been previously commanded. This enables interrupt vectors to be limited to the traditional location in the first kilobyte of physical memory space even if address translation has been enabled.

Figure 2:
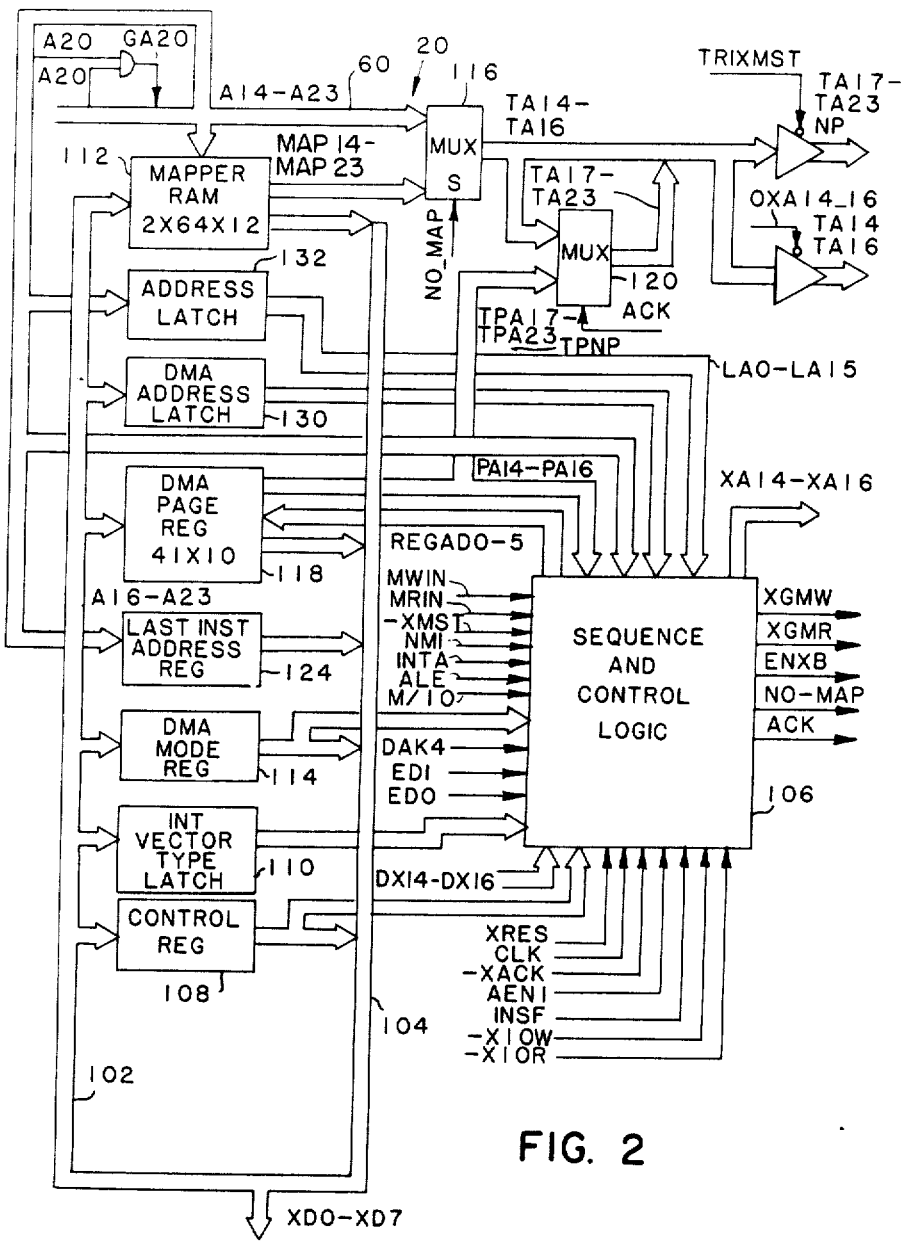
FIG. 2 is a block diagram of a computer address modification system used in the computer system shown in FIG. 1.
Figure 3:
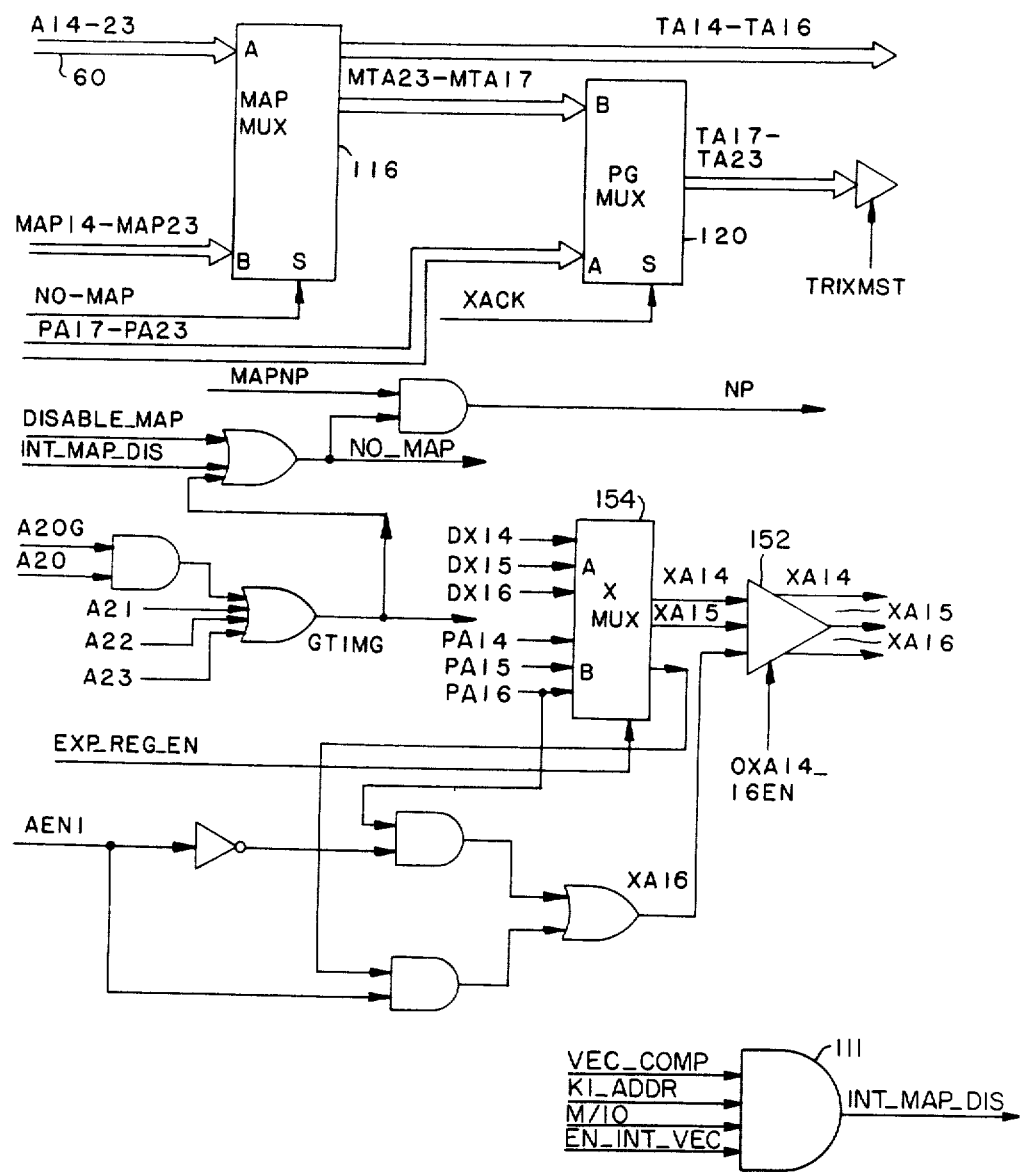
FIG. 3 is a block diagram showing in greater detail an output portion of the computer address modification system shown in FIG. 2.

Referring now to FIGS. 2 and 3, the computer address modification system 20 receives and outputs data through an input data bus 102 and an output data bus 104 which have a tri-state connection to signals XD0–XD7 on data bus 48. It will be appreciated that only the significant signal paths are shown in FIG. 2. Conventional encoding, decoding and gating for data transfers and loading of registers, flip-flops and memory cells are handled through signals generated by conventional circuits within sequence and control logic 106.

A read-write control register 108 is coupled between the input and output data buses 102, 104 and stores data providing master control over modification circuit 20. Control register 108 is located at port 410H in I/O space. Bit 5 is always read as a zero. Writing a one to bit 5 has the effect of resetting the function of detecting an interrupt vector operation during response to an interrupt request. Bits 6 and 7 are not used.

Bit 0 selectively enables or disables address translation by the modification system 20. A zero disables translation while a one enables translation. Bit 1 is a write protect bit for a mapper RAM 112. A zero write protects the RAM while a one enables writing. A zero at bit position two disables interrupt revectoring (enabling translation) while a one enables interrupt revectoring so that interrupt addresses are not translated in the same manner as other addresses. A zero at bit 3 activates or addresses a lower set of 64 storage locations in mapper RAM 112 while a one activates an upper group of 64 addresses in mapper RAM 112.

Bit position 4 enables read-write accesses to data store 44 at addresses above 1 megabyte when set to zero. If set to one the system memory read and write signals are blocked from data store 44 and from the I/O boards if address signals A20–A23 on bus 60 are not zero. A hardware reset sets the control register to 00H.

The CPU 12 responds to an interrupt request from interrupt controllers 54 by generating two pulses on signal line interrupt acknowledge, INTA. Upon the occurrence of the second pulse interrupt controllers 54 place on the local I/O data bus XD0–XD7 48 a vector type which identifies the starting location in data store 44 at which a vector pointing to the interrupt response routine is stored. The CPU 12 reads in the vector type and transfers it to address lines 2–9 to read a 4 byte vector beginning at the indicated vector type memory location.

A vector type latch enable flip-flop within sequence and control logic is set at each occurrence of the signal pulse INTA. An 8 bit interrupt vector type latch 110 also latches the contents of input data bus 102. At the second occurrence of signal INTA the proper vector type data is placed on data bus XD0–XD7 and is stored in interrupt vector type latch 110.

Thereafter, whenever CPU 12 asserts an address, sequence and control logic 106 compares the address to the latched vector type value. A signal VEC−COMP is generated to indicate that CPU 12 is accessing an interrupt vector any time CPU 12 produces an address which matches the latched vector type value while the vector type latch enable flip-flop is set or any time the input signal NMI (nonmaskable interrupt) is asserted while the CPU address indicates the standard NMI vector memory location 8-BH.

A signal INT−MAP−DIS is then generated to disable mapping when signal VEC−COMP is true and an address location within the first 1K bytes of memory is being accessed and bit position 2 of the control register 108 is set to one and input signal M/IO indicates that a memory access cycle is in progress. A signal NO−MAP is then generated to command a multiplexer 116 to pass data from the input address bus 60 rather than from mapper RAM 112 whenever signal INT−MP−DIS is asserted or one of the address lines A20–A23 is active to indicate an address above 1 meg. or a signal DISABLE−MAP is active. Signal DISABLE−MAP is generated whenever bit 0 of the control register 108 is set to zero or signal M/IO indicates that an input output operation is in progress.

A two part procedure is thus used to detect the processing of an interrupt vector by the CPU 12. First an interrupt enable condition must be established by either the assertion of two pulses on signal INTA or by assertion of the nonmaskable interrupt signal NMI. Next, the CPU 12 must access an address location corresponding to the latched vector type data for a maskable interrupt or else one of the locations 8-BH for a nonmaskable interrupt. The interrupt enable condition is terminated normally by an interrupt response routine, by writing a one into bit 5 of the control register 108 to reset the interrupt enable flip-flop or by a system reset signal. Nonmaskable interrupt detection is disabled when signal NMI is no longer asserted.

A DMA mode register 114 is an 8 bit read write register located at address 420H in I/O space. Bit positions 0–6 correspond respectively to DMA channels 0–3 and 5–7. A zero in a given bit position causes the corresponding DMA channel to be operated in clone mode (no translation) while a one indicates extended mode (translation enabled) in which a DMA page register 118 provides the 10 most significant address bits XA14–XA16 and TA17–TA23 to access a 16K block of data in extended memory space. Mode register 114 is reset to 00H in response to a hardware system reset signal.

The DMA page register 118 is made operable to generate DMA addresses by generating within sequence and control logic 106 a signal ACK which controls a page multiplexer 120. Signal ACK is generated as an inversion of input signal −XACK which is generated by bus controller 16 anytime a DMA transfer is in operation and signal −EN_PG_REG from keyboard controller 56 is active low.

A last instruction address register 124 stores the 8 most significant bits A16–A23 of each instruction fetch memory access in response to an instruction fetch input signal INSF. Register 124 is not used in the present application, but its contents can be read at I/O port 450H.

The DMA page register is actually implemented as a 64×10 addressable RAM but only 41 registers are actually used. Sixteen registers are used to provide four page registers for each of the 4 byte wide DMA channels 0–3 and 24 registers are used to provide 8 page registers for each of the three DMA word channels 5–7. Refresh is constrained to clone mode so it uses only a single channel.

A writeable DMA page address latch 130 appears at address port 430H in I/O space and communicates a latched address to sequence and control logic 106. A multiplexer selectively connects the 6 bit address input for the page RAM to the DMA page register address latch 130 or to the DMA address selection signals. The 41 registers of page register 118 are thus read or written by first writing the I/O space address of the desired register into the DMA page address latch 130 at port 430H to select the desired register. The selected register is then read or written at port 431H for address bits A16–A23 and at port 432H for address bits A14 and A15 (LSB first). In clone mode the port addresses are assigned to match the standard address assignments used by IBM in its PC AT systems. They are 87H, 83H, 81H, 82H for byte channels 0 to 3, 8BH, 89H, 8AH for word channels 5-7 and 8FH for REFRESH.

It should be understood that the same address location within the page register 64×10 memory 118 is used for both the clone mode, and the first register (first 16K block) for extended mode. However, a second DMA page register address is assigned to the register for extended mode so that the same memory location can be accessed by system I/O operations in two different ways. These register addresses are written into latch 130 to select the proper memory location within page register 118.

For extended mode channel 0 has four page registers at ports 07H, 17H, 27H and 37H. Channel 1 has four registers at 03H, 13H, 23H and 33H. Channel 2 has four registers at 01H, 11H, 21H and 31H. Channel 3 has four registers at 02H, 12H, 22H and 32H. Channel 5 has eight registers at 0BH, 1BH, 2BH, 3BH, 4BH, 5BH, 6BH and 7BH. Channel 6 has eight registers at 09H, 19H, 29H, 39H, 49H, 59H, 69H, and 79H. Channel 7 has eight registers at 0AH, 1AH, 2AH, 3AH, 4AH 5AH, 6AH and 7AH. For extended mode Refresh is addressable at register 0FH. The extended mode addresses are still written into the DMA address latch 130 at port address 430H.

During a DMA transfer I/O controller 18 outputs signals DAK4, ED1 and ED2 to select one of the DMA channels or Refresh. The selection codes are assigned as 000 for channel 3, 001 for channel 0, 010 for channel 1, 011 for channel 2, 100 for channel 7, 101 for REFRESH, 110 for channel 5 and 111 for channel 6.

Referring to FIG. 1 as well as FIG. 2, a spare readable and writeable register location in the keyboard controller has bit 0 designated as an external page register bit and generates an output signal −EN_PG_REG. Other storage locations could be used as well but this one happened to be available as a spare. Signal −EN_PG_REG goes inactive high to command a mapped clone mode (or clone mode if mapping is not enabled) in which DMA addresses are conventionally generated by readable and writeable page registers within I/O controller 18 and the modification system 20 is masked from the DMA transfer mode. It thus operates as if a normal CPU memory access were in progress and translates the address as described below. To accomplish the masking, the normal ACK, IOW and IOR signals are modified by I/O controller 18 to produce signals XACK, XIOW and XIOR when −EN_PG_REG is high. In mapped clone mode gate 82 couples address signal DX14–DX16 to A14–A16 and gate 84 operates on the output signals to couple TA14–TA16 to XA14–XA16.

Signal
$$-XACK = -(REFRESH + EN\_PG\_REG \cdot ACK) \tag{1}$$

This allows refresh to pass through to the modification system but blocks the ACK signal which indicates a DMA transfer is in progress unless signal −EN_PG_REG is active low.

The port and write signals are blocked by the ACK signal to prevent an I/O space port access to modification system 20 while a DMA transfer is in progress. The relationships are, $$-XIOR = -(IOR \cdot -ACK) \tag{2}$$

$$-XIOW = -(IOW \cdot -ACK) \tag{3}$$

The DMA page register modes can be summarized according to the state of signal EN_PG_REG. If signal EN_PG_REG is inactive the I/O controller 18 operates conventionally to generate the upper address bits for each DMA address. If mapping is enabled by control register 108 a mapped clone mode is established and the DMA addresses are mapped along with other addresses. If mapping is not enabled a clone mode of operation emulates an IBM PC-AT computer.

If signal EN_PG_REG is active then generation of the upper address bits by I/O controller 18 is inhibited, the upper address bits are generated by DMA page register 118 and all mapping of DMA addresses is inhibited. If an active DMA channel is enabled by a corresponding bit in DMA mode register 114 then DMA operation occurs with the 8 DMA page registers for each channel (4 for byte DMA channels) providing paging in 16K blocks. If a given channel is not enabled by the DMA mode register then operation proceeds in a special clone mode. Special clone mode is functionally the same as clone mode except the upper address bits are generated by a subset of the DMA page registers 118 having one register per DMA channel. This subset of registers is assigned the same conventional I/O port addresses as the conventional page registers in I/O controller 18 and thus stores the same data so that functionally system operation is the same as in clone mode.

In the mapped clone mode DMA addresses are generated as in the IBM PC-AT computer. The conventional page registers within the I/O controller 18 supply address bits A16-A23 (A17-A23 for word transfers) on bus 60 to the computer address modification system 20. Address signals A14-A15 (A14-A16 for word transfers) are transferred by the active DMA controller over local I/O bus 48 to latch 76. From latch 76 they are transferred through bus 80, gate 82 and bus 60 to computer address modification system 20. Address signals A0-A7 (A1-A8 for word transfers) are supplied by the active DMA controller 50 to XA bus 72. Address signals A8-A13 (A9-A13 for word transfers) are supplied by the active DMA controller 50 over bus 48 to latch 76 and then to bus 72.

The computer address modification system 18 then translates the supplied DMA address as if it were a CPU supplied address. Upper address signals TA14-TA23 are output to bus 64 and made available to gates 84 and bus 86 to positions XA14-XA16 on XA bus 72. They are thus made available at gate 70 along with signals A0-A13 on lines XA0-XA13.

When internal paging is activated by assertion of signal —EN_PG_REG active low the DMA mode register determines separately for each channel whether operation occurs in a special clone mode or an extended mode. The channel selection signals DAK4, ED1 and ED2 are coupled as selection inputs to an 8:1 multiplexer which receives the outputs from the DMA mode register 114. The selected multiplexer output signal determines whether special clone mode or extended mode is in effect for the currently selected channel. For refresh, clone mode is always input to the multiplexer.

In both special clone mode and extended mode the computer address modification system 20 responds to a DMA access by supplying upper level address signals obtained from DMA page register 118. The generated DMA address signals are not further mapped. Signals XA0-XA13 (XA1-XA13 for word transfers) are placed on XA bus 72 by the DMA controller 50 and are not changed by computer address modification system 20.

In special clone mode upper address signals TA1-6-TA23 (TA17-TA23 for word transfers) are provided by a selected DMA page register 118. In extended mode upper address signals XA14-XA16 and TA17-TA23 are provided by the DMA page register 118.

The middle bits are handled differently for clone mode and extended mode. In clone mode signals DX14-DX15 (DX14-DX16 for word transfers) are passed through to outputs XA14-XA15 (XA14-XA16 for word transfers) on XA bus sections 86 and 72. In extended mode address signals DX14-DX15 (DX14-DX16 for word transfers) are used to select one of four (one of 8 for word transfers) DMA page registers 118 which corresponds to an indicated 16K page for the currently active DMA channel. Gates 82 and 84 block transfer of the middle bits during both modes of operation.

To address the 64×10 RAM within DMA page register 118 during DMA operation the channel selection signals DAK4, ED1 and ED2 provide 3 of the required 6 address bits and received address bits DX14-DX16 provide the other three bits (DX14-DX15 for a byte DMA). Signals DX14-DX16 are gated by signal EX-P_REG_EN (see FIG. 5) to outputs XA14-XA16 only in special clone mode with page register signals PA14-PA16 being gated out for extended mode. Signal DX16 is further gated by signal DAK4 to be effective only for a word transfer.

When I/O controller 18 generates signal XACK to acknowledge a DMA request, if signal EN_PG_REG is inactive it also asserts address signals A17-A23 (A1-6-A23 for byte transfers) which are communicated through multiplexer 116 to TA17-TA23 (TA16-TA17 for byte transfers). The DMA controller 50 places on local address bus 72 signals XA0-XA7 for a byte transfer and XA1-XA8 for a word transfer (bit 0 is an implied 0). Signals A8-A15 (A9-A16 for a word transfer) are placed on the XD data bus 48 and held by latch 76 for presentation to buses 72 and 80.

Latch 76 places on the XA Bus 72 signals XA8-XA13 for a byte DMA and XA9-XA13 for a word DMA. The latch 76 also communicates signals 14, 15 (and 16 for a word DMA) over DX bus 80 to modification system 20. In clone mode and special clone mode bits DX14 and DX15 (DX14-DX16 for word transfers) are passed through to XA14 and XA15 (XA14-XA16 for word transfers). Bit zero of the first page register of the selected channel drives output XA16 for byte transfers. These signals are coupled through gate 70 to system bus 74 along with signals XA0-XA13. Signals A17-A23 are output from the selected DMA page register as signals TA17-TA23 and coupled through gate 66 to LA bus 68. In extended mode, the modification system uses address inputs XA14, XA15 (plus XA16 if a word transfer) to select one of the four registers associated with each channel (8 for word channels) to read the 10 most significant bits from the selected page register. These are output as XA14-XA16 and TA17-TA23.

An address latch 132 latches each successive input address signal A0 to A15 to hold the signal for decoding or logic processing. It does not contribute to control of significant data flow.

Figure 4:
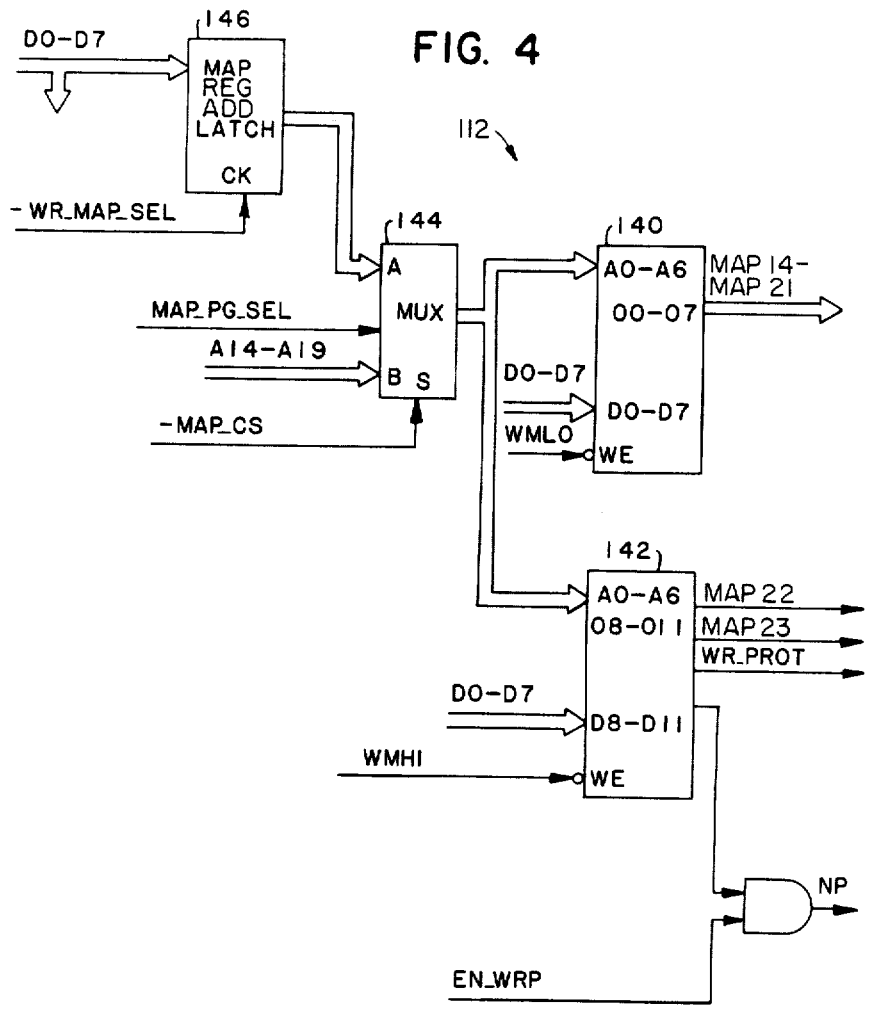
FIG. 4 is a block diagram representation of a mapper ram used in the computer address modification system shown in FIG. 2.

The mapper RAM 112 is shown in greater detail in FIG. 4 and includes two memory sections 140, 142. Memory section 140 is 128×8 and section 142 is 128×4 to provide a total capacity of 128×12. The address inputs are provided by a multiplexer 144 having A inputs connected to the output of an address latch 146 and B inputs connected to a signal MAP_PG_SEL and input address signals A14-A19. Signal MAP_PG_SEL is driven by bit 3 of the control register 108. This enables environment swapping between the upper and lower bank of 64 registers merely by changing one bit in the control register 108. The 6 least significant B inputs receive input address signals A14-A19.

To read or write mapper RAM 140, 142 the desired address 0-127 is first written into address latch 146 by making an I/O space write at port address 440H. Sequence and control logic decodes the port address and responds to the I/O signal and XIOW signal to generate latching signal $-WR\_MAP\_SEL$ when all required conditions are met. This loads data from input data bus 102 into address latch 146.

Next the RAM 112 itself is addressed at port 441H for low module 140 and address 442H for high module 142. If one of these ports is properly decoded signal $-MAP\_CS$ is generated to pass the contents of address latch 146 to the address inputs of RAM modules 140, 142. If writing, the write map signal WMLO or WMHI is generated to load the input data bus 102 signals into the selected address location. If reading, the output of the selected location is gated onto the output data bus 104 through gating circuits that are not explicitly shown.

During normal memory access operation, multiplexer 144 passes signal MAP_PG_SEL and address signals SA14-SA19 to the address inputs of RAM modules 140, 142. The mapped translated addresses MTA 14 to MTA 23 are coupled to bus multiplexer 116 (FIG. 3). Signals MTA14-MTA16 are communicated to sequence and control logic 106 for use in generating signals XA14-XA16.

The write protect signal WR_PROT is also communicated to sequence and control logic 106 to inhibit generation of the output write signal XGMW when signal WR_PROT is active high. The not present memory output is ANDed with a signal enable write protect EN_WRP that is generated when the modification system 20 is active. The resulting NP signal is provided as an output but is not used in the present configuration.

Figure 5:
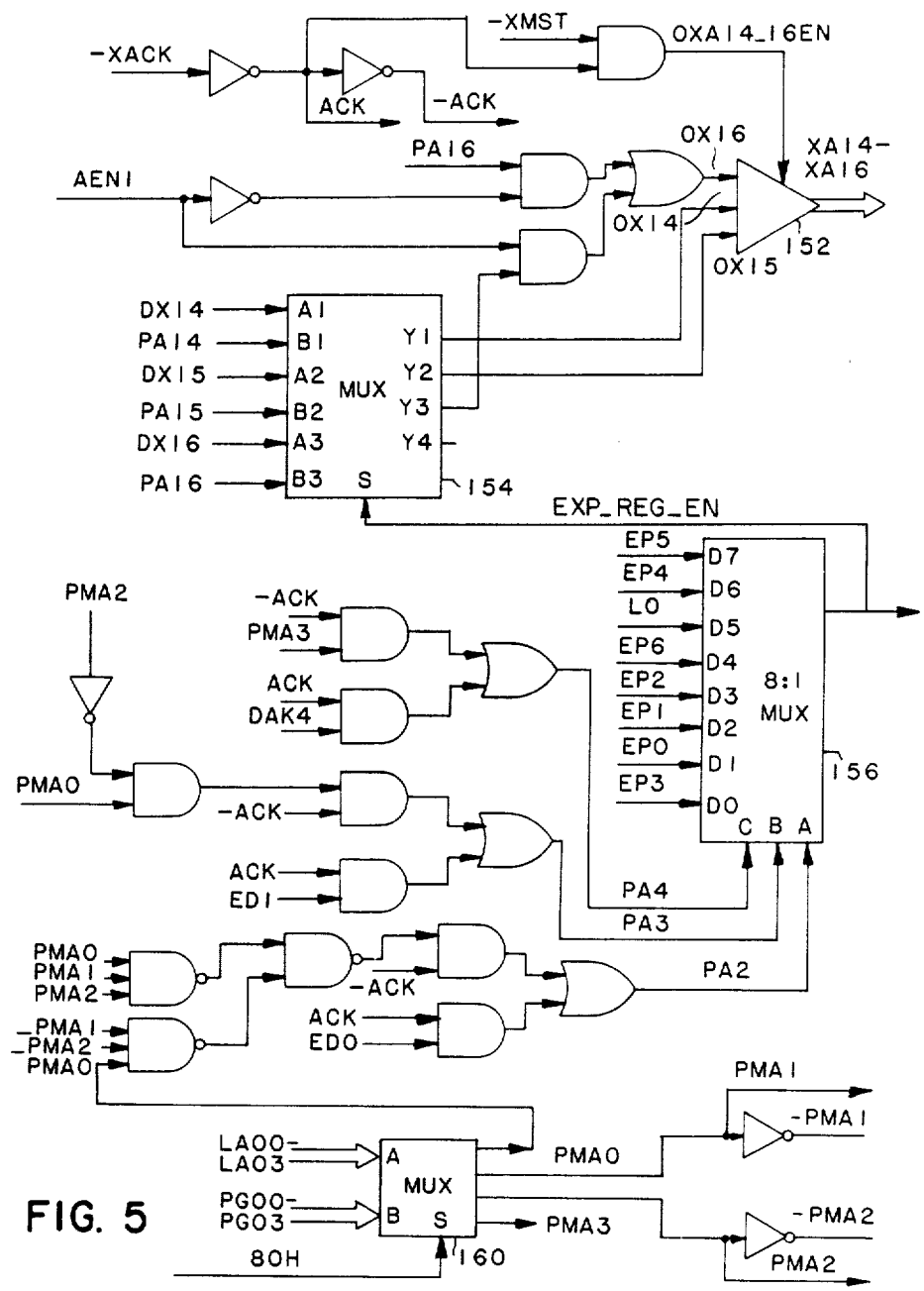
FIG. 5 is a block diagram representation of the logic within the computer address conditioning system shown in FIG. 2 for generating certain output address signals.

The generation of signals XA14-XA16 is complicated by the DMA transfers and is therefore shown in greater detail in FIG. 5. A translate output buffer 152 gates the signals out when ACK is high to indicate that a DMA transfer is in progress and signal $-$XMST is inactive high to indicate that an extended bus (not used in this implementation) is not in control.

If address input AEN1 from DMA channel 1 is low page register 118 data output PA16 automatically sources signal XA16. If high, XA16 is driven along with XA14 and XA15 by the output of a multiplexer 154. MUX 154 receives input data signals DX14-DX16 as A inputs and page register 118 data signals PA14-PA16 as B inputs. The select input to MUX 154 is driven by a signal EXP_REG_EN which is taken from an 8:1 MUX 156 to indicate whether or not extended mode is fully enabled for the active DMA channel. It receives 7 EP inputs from the DMA mode register 114.

The three selector inputs PA4-PA2 are determined in response to decoding of the acknowledge signal ACK, DMA channel address signals DAK4, ED1 and ED0 and page memory address signals PA0-PA3.

Signals PMA0-PMA3 are generated by a MUX 160 which receives as A inputs signals LA00-LA03 from address latch 132 and as B inputs signals PG0-PG3 from the DMA address latch 130. MUX 160 A input is selected by signal 80H which goes active when ACK is low while address latch 132 signal LA7 is high and LA5, LA6, LA8, LA9, and LA10 are low. Signal 80H thus indicates that one of the standard page register port addresses between 80H and 9FH is being accessed.

Figure 6:
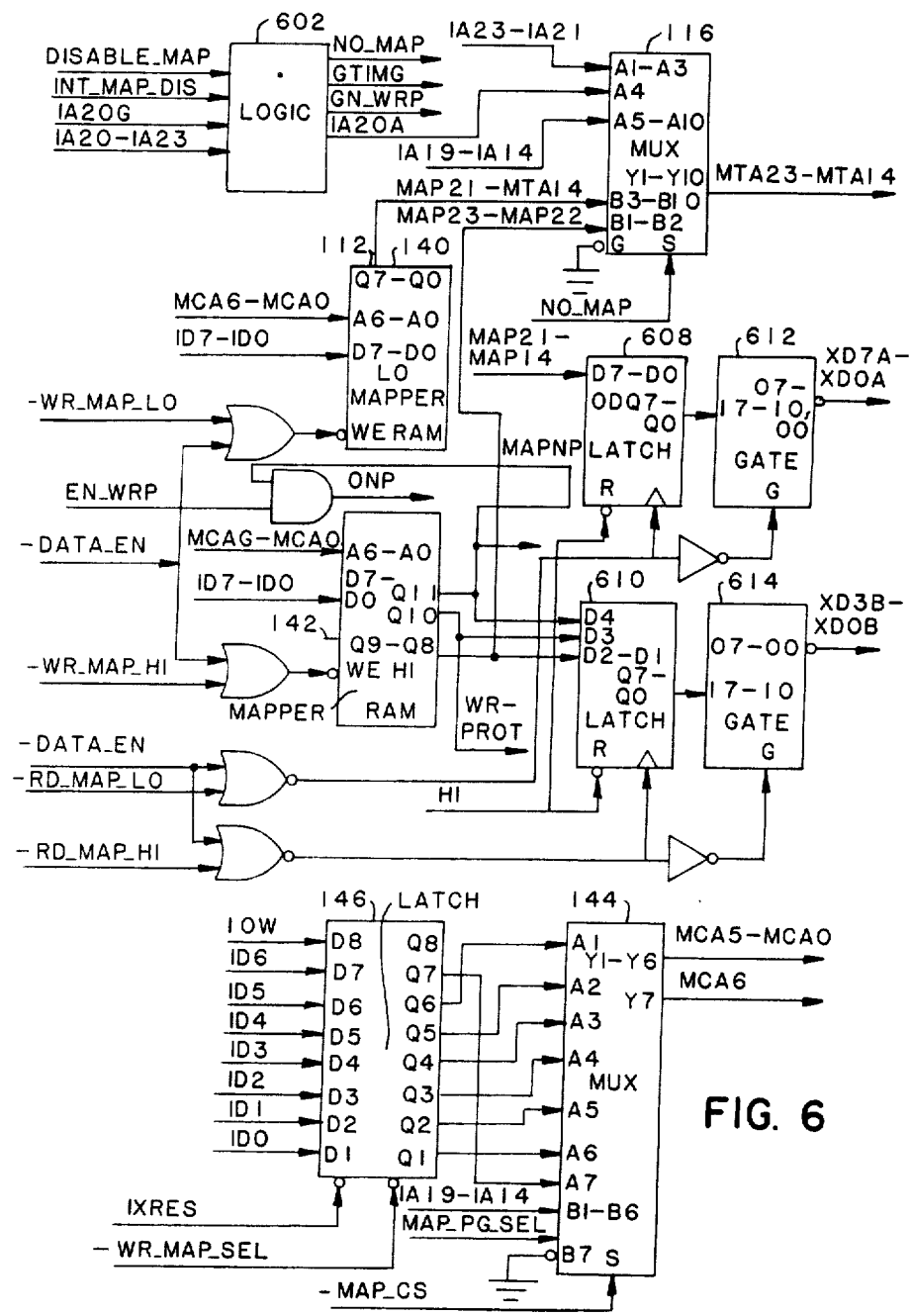
FIG. 6 is a block diagram and schematic representation of the mapper ram and its associated control circuitry.

The specific implementation of the address modification system 20 is shown in greater detail in FIGS. 6-20 to which reference is now made. The mapper ram 112 and its associated control circuits are shown in FIG. 6. A logic block 602 receives system address input signals IA23-IA20 from address bus A00-A23 along with the signal DISABLE_MAP and the interrupt revectoring signal INT_MAP_DIS. Logic 602 generates the following output signals:

$$IA20A = IA20 \cdot IA20G \quad (4)$$

$$GT1MG = IA20A \cdot IA21 \cdot IA22 \cdot IA23 \quad (5)$$

$$NO\_MAP = (DISABLE\_MAP + INT\_MAP\_DIS + GT1MG) \quad (6)$$

$$EN\_WRP = -NO\_MAP \quad (7)$$

An address multiplexer 144 drives the address inputs to the mapper ram 112 modules 140, 142. During normal operation multiplexer 144 receives the system input address signals IA19-IA14 at inputs B1-B6 and the page select signal, MAP_PG_SEL, from bit 3 of control register 108 at input B7. These signals are communicated as address inputs MCA6-MCA0 to the mapper RAM modules 140, 142.

Alternatively, a RAM address latch 146 receives from the system data bus a desired address which is latched when signal $-WR\_MAP\_SEL$ is generated upon decoding the proper I/O space address (440h). Upon subsequently decoding the address for one of the mapper ram sections 140, 142 signal $-MAP\_CS$ is generated to cause multiplexer 606 to pass the data stored by latch 604 as address signals to the ram section 140, 142. Latches 608, 610 latch the data outputs from ram sections 140, 142 when decoding of the proper I/O space addresses produces signals $-DATA\_EN$ and $-RD\_MAP\_LO$ or $-RD\_MAP\_HI$. Gates 612, 614 (which may be implemented as simple NAND gates that gate each latch output signal when enabled by the gate signal) then pass the appropriate signal group XD7A-XD0A or XD3B-XD0B for placement in the output data bus 104.

Figure 7:
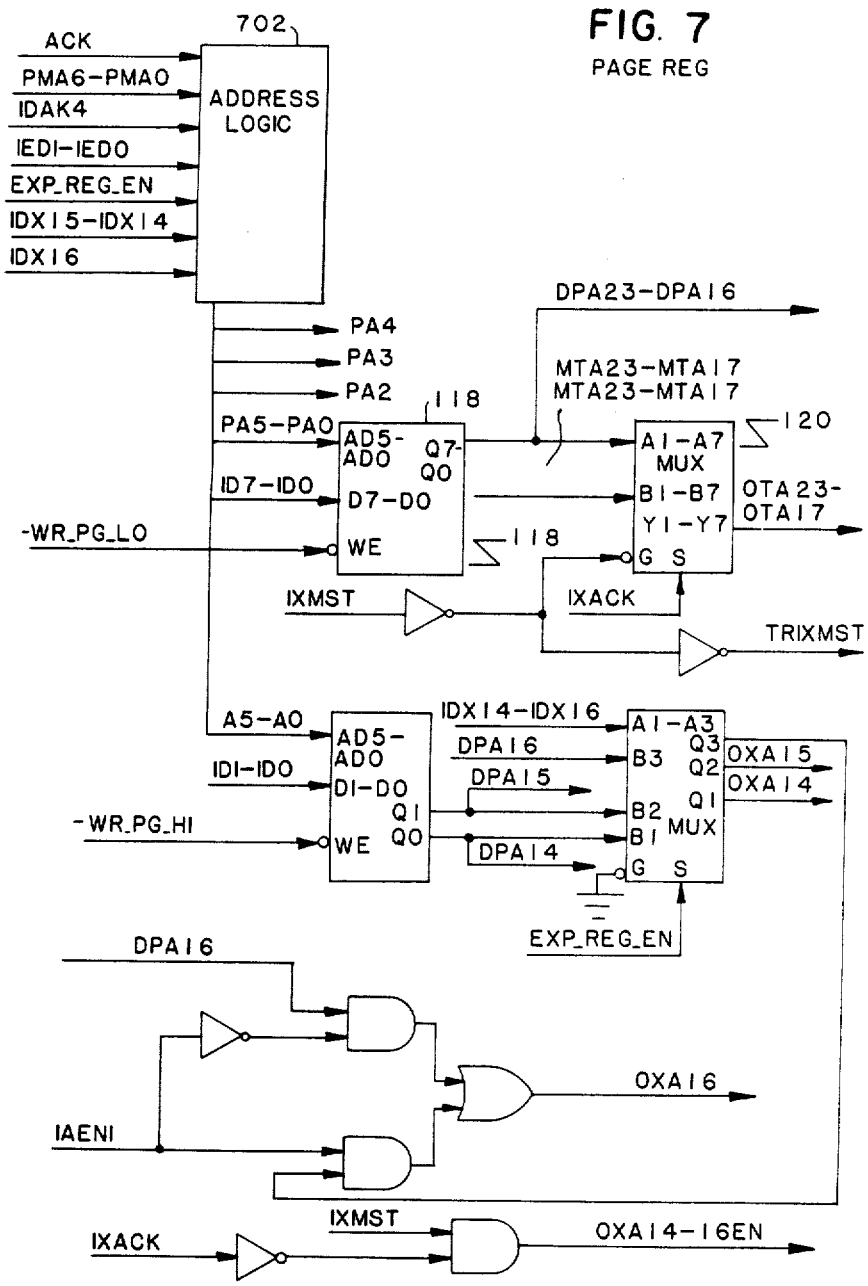
FIG. 7 is a block diagram and schematic representation of DMA control logic.

The DMA register 118 control logic is shown in FIG. 7 to which specific reference is now made. Address logic 702 generates the page register address signals A5-A0 in accordance with the following logic equations:

$$PA5 = -ACK \cdot (PMA6) + ACK \cdot (IDAK4 \cdot EXP\_REG\_EN \cdot IDX16) \quad (8)$$

$$PA4 = -ACK \cdot (PMA3) + ACK \cdot (IDAK4) \quad (9)$$

$$PA3 = -ACK \cdot (PMA0 \cdot - PMA2) + ACK \cdot (IED1) \quad (10)$$

$$PA2 = -ACK \cdot (PMA0 \cdot PMA1 \cdot PMA2 + PMA0 \cdot - PMA1 \cdot - PMA2) + ACK \cdot (IED0) \quad (11)$$

$$PA1 = -ACK \cdot (PMA5 \cdot EXP\_REG\_EN) + ACK \cdot (IDX15 \cdot EXP\_REG\_EN) \quad (12)$$

$$PA0 = -ACK \cdot (PMA4 \cdot EXP\_REG\_EN) + ACK \cdot (IDX14 \cdot EXP\_REG\_EN) \quad (13)$$

It will be noted that when ACK is active the address inputs are driven by the DMA channel identification signals IED0, IDE1 and IDAK4 to select a set of registers from up to 8 sets which relate to 8 different channels and by middle input address signals IDX14–IDX16 which select one register within the selected set of registers. Signal IDAK4 identifies a two byte channel and blocks IDX16 for address A5 when a single byte channel is active.

When a DMA access is not in progress signal ACK is inactive and the address inputs to page register 118 are driven by signals PMA0 to PMA6 in response to I/O space addresses.

Figure 8:
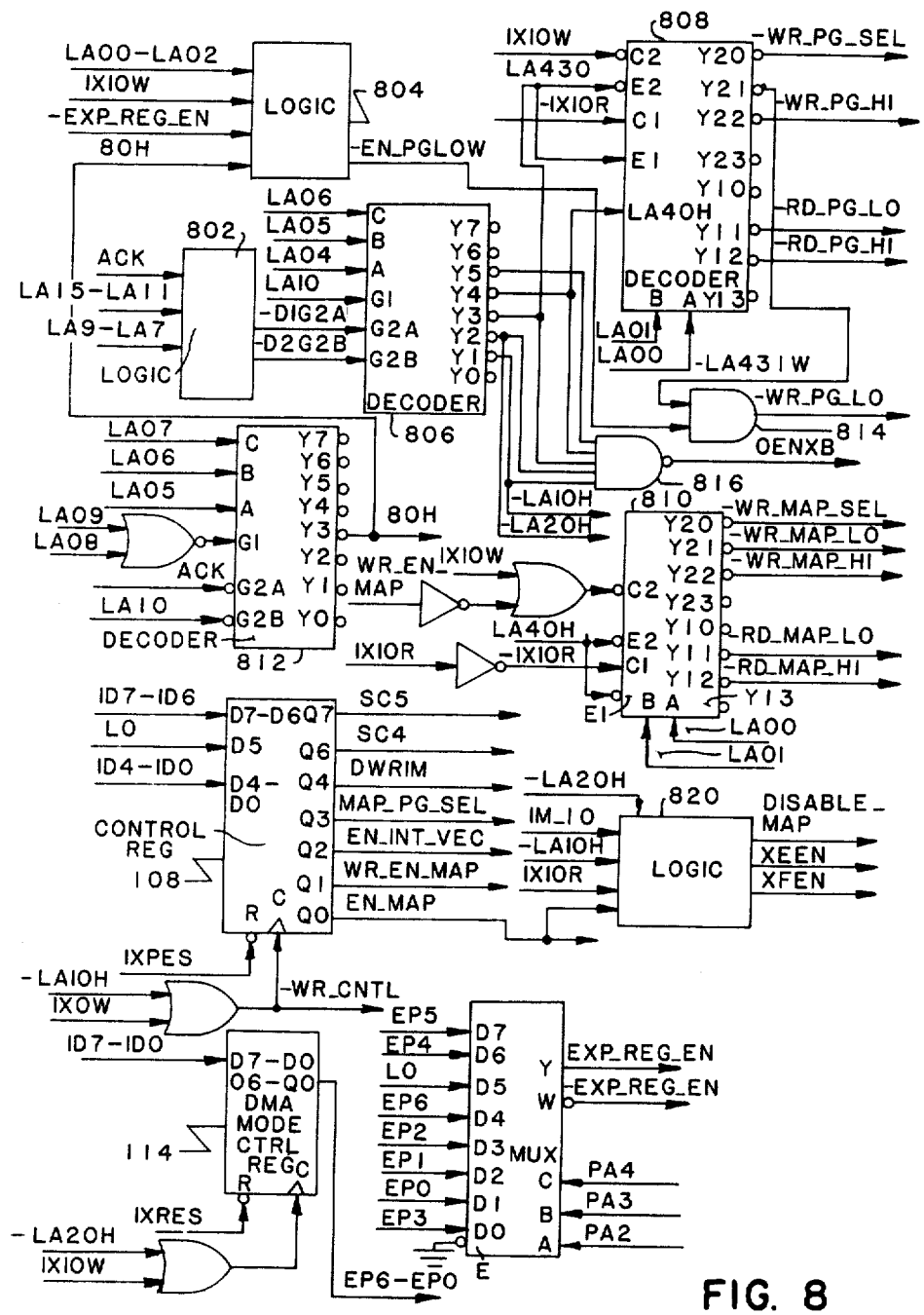
FIG. 8 is a block diagram and schematic representation of I/O address space decoder logic.

I/O address space decoder logic is shown in FIG. 8 and includes a decoder 806 receiving as inputs, latched address signals LA06–LA04 from address latch 132. Gate input G1 is driven by signal LA10 while the inverting gate inputs are driven by signals −DIG2A and −D2G2B from logic circuit 802 having the functions:

$$-D1G1A = -[(-ACK) \cdot (LA15) \cdot (-LA14) \cdot (-LA13) \cdot (-LA12) \cdot (-LA11)] \quad (14)$$

$$-D2G2B = -[(-LA09) \cdot (-LA08) \cdot (-LA07)] \quad (15)$$

Decoder 806 thus operates to decode signals LA06–LA04 when LA10=0 (400H ex) and LA15–LA11 and LA09–LA07 are all zero.

Logic circuit 804 generates signal $$-EN\_PGLOW = -(-EXP\_REG\_EN \cdot -IXIOW \cdot -80H \cdot (-LA00 \cdot LA02 + LA01 \cdot LA02 + -LA00 \cdot -LA01)) \quad (16)$$

AND gate 814 combines this signal with signal −LA431W so that the section of the page register 118 which drives address lines TA23–TA17 is write enabled in response to a direct I/O space address for that section or when the CPU addresses one of the conventional system page registers in clone made or one of the matching registers in special clone mode. More specifically, WR_PG_LO becomes active when extended mode is not active for the specific channel, when IXIOW (an active low signal) indicates an I/O write is in progress, and when signal 80H (active low) indicates an address of 80H–8FH and one of the I/O locations 0, 8, 4, C, 5, D, 6, E is not being addresses within this range. The signal −WR_PG_LO thus enables writing to the first page register for each channel when not in extended mode so that the register can emulate the corresponding system register in special clone mode.

A logic circuit 820 receives signals IM_IO (memory IO active), IXIOR (IO Read is active), GT1MG (greater than one megabyte), −LA20H (address 20H–2FH) and responds by generating the following signals.

$$DISABLE\_MAP = -(IM\_IO \cdot EN\ MAP) \quad (17)$$

$$XEEN = -(LA20H \cdot -IXIOR) \quad (18)$$

$$XFEN = -(LA10H \cdot -IXIOR) \quad (19)$$

$$DMWR = GT1MG \cdot DW1M \quad (20)$$

Signal DISABLE_MAP is used as a disable control for signal IXP (FIG. 3) and for gating of data from the mapping ram. Signals XEEN and XFEN are used to gate the contents of the DMA mode register 114 and control register 108 onto the output data bus 104. Signal DMWR (disable map write) is used in generating output memory read and write gate signals.

Figure 9:
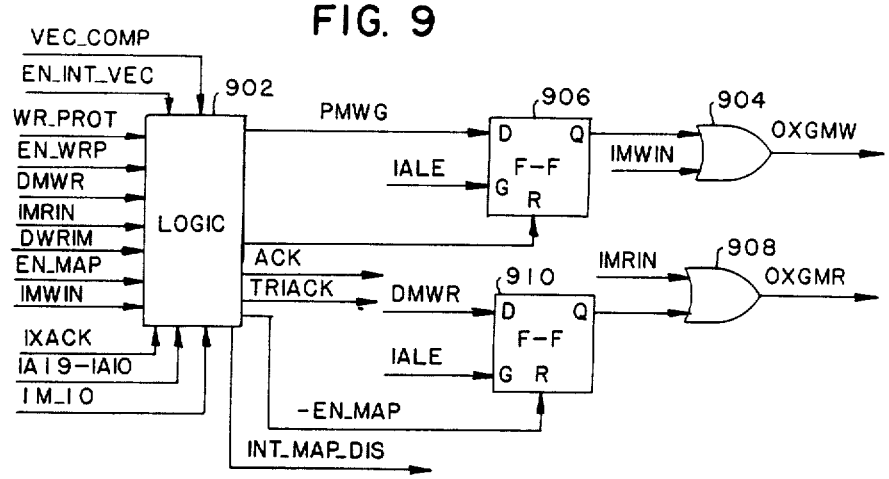
FIG. 9 is a block diagram and schematic representation of circuitry for generating gated memory read and write output signals.

FIG. 9 shows circuitry for generating the gated memory read and write output signals OXGMW and OXGMR. Signal OXGMW is generated by an OR gate 904 as the logical OR of the input write gate signal IMWIN and the output of a flip-flop 906. Flip-flop 906 has its data input driven by $$PMWG = WR\_DR0T \cdot EN.WRP + DMWR \quad (21)$$

is connected to the input address latch enable signal IALE.

Similarly, an OR gate 908 receives input memory to read signal IMRIN and OR's this signal with the Q output of a flip-flop 910 to generate the output read gate signal OXGMR. Flip-flop 910 receives signal DMWR at its data input and the address latch enable signal IALE at its gate input. Its reset input is connected to signal −EN_MAP.

Logic 902 also generates the following signals which are used by the address modification system 20.

$$ACK = -IXACK \quad (22)$$

$$TRIACK = -ACK \quad (23)$$

$$INT\_MAP\_DIS = IXACK \cdot (IA19-IA10=0) \quad (24)$$

Signal INT_MAP_DIS goes true when signal IXACK indicates that an interrupt is being acknowledged while the nonextended address signals above IA09 are all zero, thus indicating that a memory location in the range 0–1023 is being addressed. This is the hardware defined interrupt vector storage range for the Intel 8088-80386 family of microprocessors.

Figure 10:
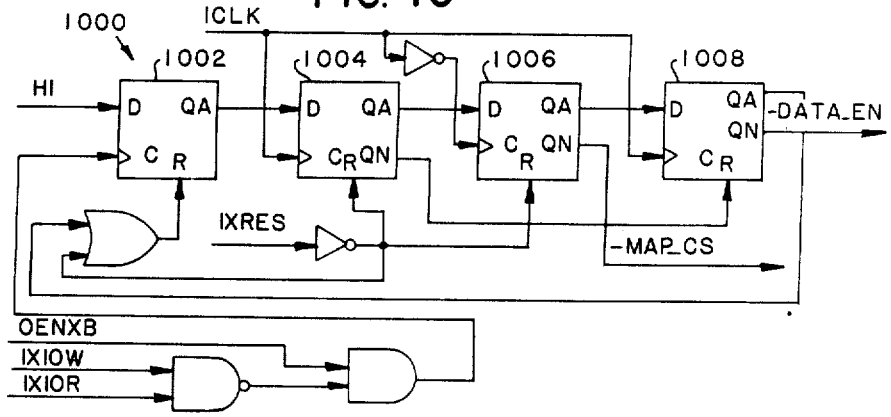
FIG. 10 is a block diagram and schematic representation of a timing generator circuit.

A timing generator circuit 1000 is shown in FIG. 10 as including four cascaded flip-flops 1002, 1004, 1006 and 1008. Flip-flop 1002 is set when clocked by the occurrence of an I/O read or write pulse or when signal output enable x bus, OGNXB, goes true. This causes a logic one to be synchronously and sequentially passed through the three remaining flip-flops 104–108 as they are clocked by the input clock signal ICLK and its complement. As soon as the logic 1 signal reaches flip-flop 1006 its QN output goes active low to generate signal −MAP_CS, which controls multiplexer 606 to select the address inputs to mapping ram 112. A half clock cycle later flip-flop 1008 becomes set to force its output QN active low to generate signal −DATA_EN which enables writing of mapping ram 112.

Figure 11:
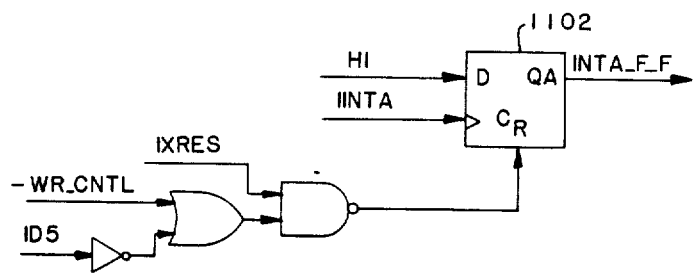
FIG. 11 is a block diagram and schematic representation of an interrupt flip-flop.

FIG. 11 shows the interrupt flip-flop 1102 which indicates that an interrupt has been acknowledged. Flip-flop 1102 is set when clocked by the input interrupt acknowledge signal to generate signal INTA_F_F. It is reset when control register 108 is written with data bit 5 set or in response to the system reset signal IXRES.

Figure 12:
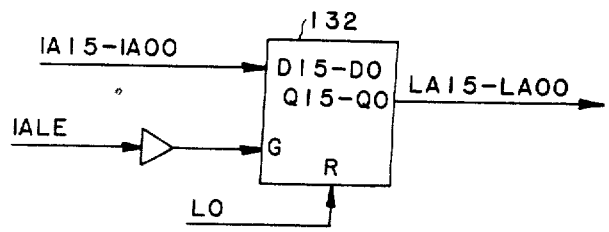
FIG. 12 is a block diagram representation of a memory address latch.

FIG. 12 shows the implementation of the memory address latch 132 which receives input addresses IA15–IA00 and outputs latched addresses LA15–LA00 respectively. Latch 132 is clocked by input address latch enable signal, IALE.

Figure 13:
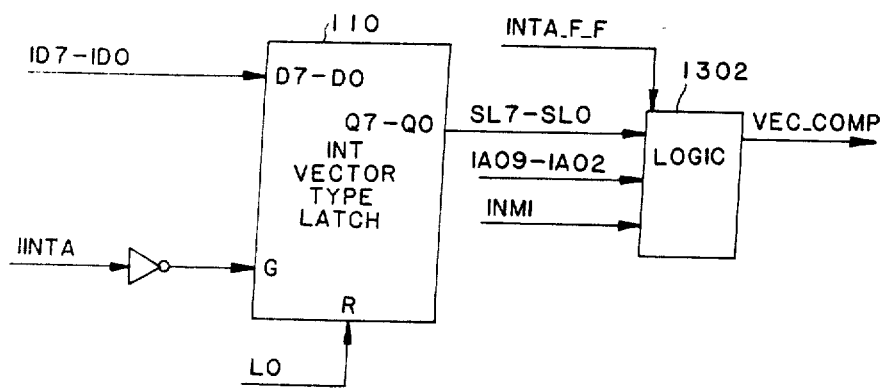
FIG. 13 is a block diagram and schematic representation of a circuit for generating an interrupt response detection signal.

The circuitry for generating the interrupt response detection signal is shown in FIG. 13. An interrupt vector type latch 110 receives from the input data signals ID7–ID0 and latches the interrupt vector type generated by interrupt controllers 54 in response to the input interrupt acknowledge signal, IINTA. The logic circuit 1302 generates the vector compare signal VEC—COMP, $$VEC\_COMP = INTA\_F\_F \cdot VEC\_MATCH + T\text{-}NMI \quad (25)$$

when the interrupt acknowledge flip-flop 1102 has been set and the current address signals IA09-IA02 match the interrupt vector type SL7-SL0 stored in interrupt vector type latch 110. Signal TNMI is generated according to the function $$TNMI = INMI \cdot (-IA02) \cdot IA03 \cdot (-IA04) \cdot (-IA05) \cdot (-IA06) \cdot (-IA07) \cdot (-IA08)(-IA09) \quad (26)$$

which indicates that the input nonmaskable interrupt signal, INMI, is active while one of the hardware defined nonmaskable interrupt vector storage location 0000:0008H 0000:000BH is being addressed. Signal VEC—COMP may thus be used to inhibit modification of an interrupt vector address.

Figure 14:
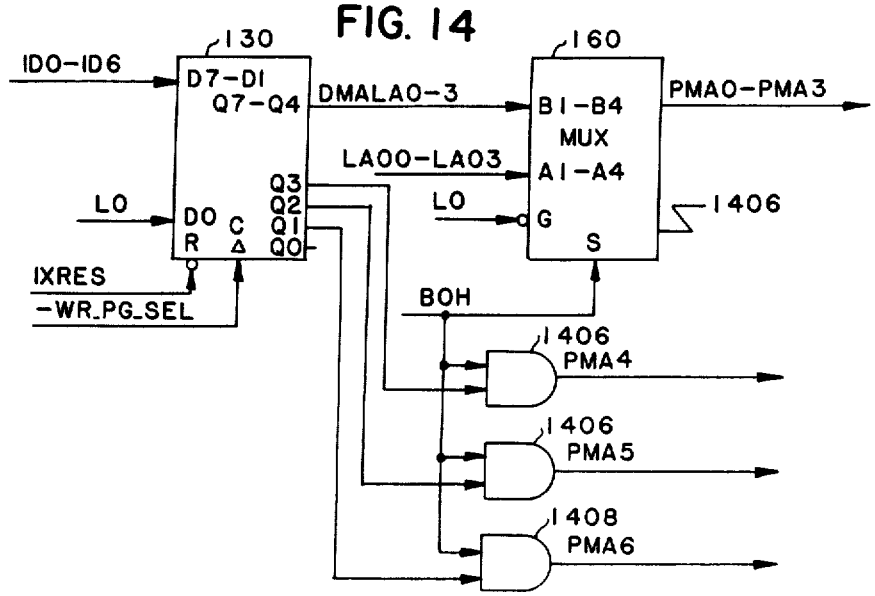
FIG. 14 is a block diagram and schematic representation of an I/O address multiplexer circuit.

The page memory I/O address multiplexer circuit 1402 is shown in FIG. 14. It includes the DMA address 130 latch which received and latches input data signals ID0-ID6 in response to signal −WR—PG—SEL which is decoded from the I/O address inputs. A multiplexer 160 receives the four low bit latched address signals DMALA0-DMALA3 at its B input and latched address signals LA00-LA03 at its A inputs.

Except when one of the clone mode page registers is being addressed, signal 80H remains inactive high and signals PMA0-PMA6 reflect the contents of the DMA address register 130. This enables the CPU to read or write a selected one of the 41 registers within the DMA page register 118 by first writing the selected address into DMA address register 130 using I/O address space port 430H and then reading or writing the selected high or low page register section at port 431H or 432H respectively.

Each of the conventional clone mode AT page registers lies within the 110 address space 80-8FH. When one of these I/O space addresses is asserted, signal 80H goes active low to disable AND gates 1404, 1406 and 1408 and cause multiplexer 160 to conduct latched address signals LA00-LA03 to output signals PMA0-PMA4. These four signals are sufficient to distinguish among the 8 clone mode DMA registers and permit a selected register to be written at the conventional AT I/O space port addresses. This facilitates the dual clone mode/extended mode addressing for these eight registers so that they can track the eight conventional counterparts contained within I/O controller 18.

It will be recalled form the discussion of FIG. 7 that address logic 1702 operates as a multiplexer to convey to the address terminals of page register 118 either the PMA0-PMA6 I/O address signals or the DMA page register selection signals IED1, IED0, IDAK4 and IDX16-IDX14.

Figure 15:
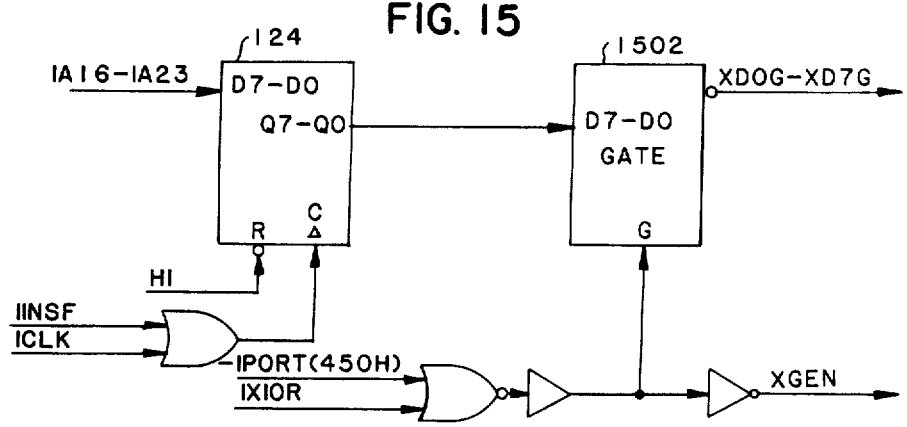
FIG. 15 is a block diagram and schematic representation of a last instruction address register.

FIG. 15 shows in detail the last instruction address register 124. It receives input address signals IA16-IA23 as inputs when clocked by the input clock signal ICLK while the input instruction fetch signal, IINSF, is active low. A gate 1502 makes the output of latch 124 available to the output data bus 104 when signal −I-PORT (450H) indicates that the instruction fetch register 124 I/O address has been decoded while I/O read signal IXIOR is active low. This gate signal is then inverted to produce an output enable signal, XGEN.

Figure 16:
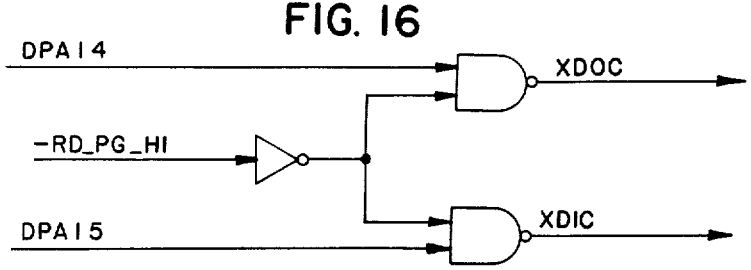
FIG. 16 is a schematic representation of signal generating logic.

Miscellaneous logic circuits which primarily provide input and output buffering and gating complete the description of the computer address modification system 20. As shown in FIG. 16, signals DPA14 and DPA15 are gated by signal −RD—PG—HI to produce signals XD0C and XD1C for gating to the output data bus when the high section of the page register is read.

Figures 17, 18:
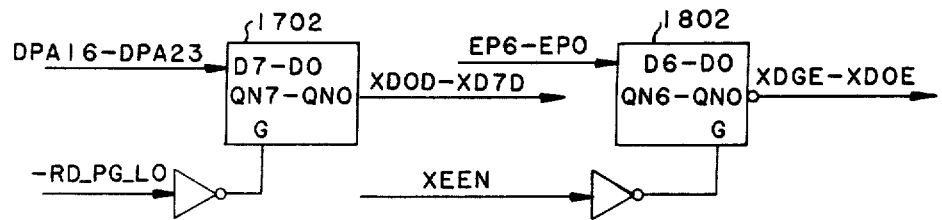
FIG. 17 is a block diagram and schematic representation of a signal gate.
FIG. 18 is a block diagram and schematic representation of a gate for output signals for the DMA mode control register.
Figure 19:
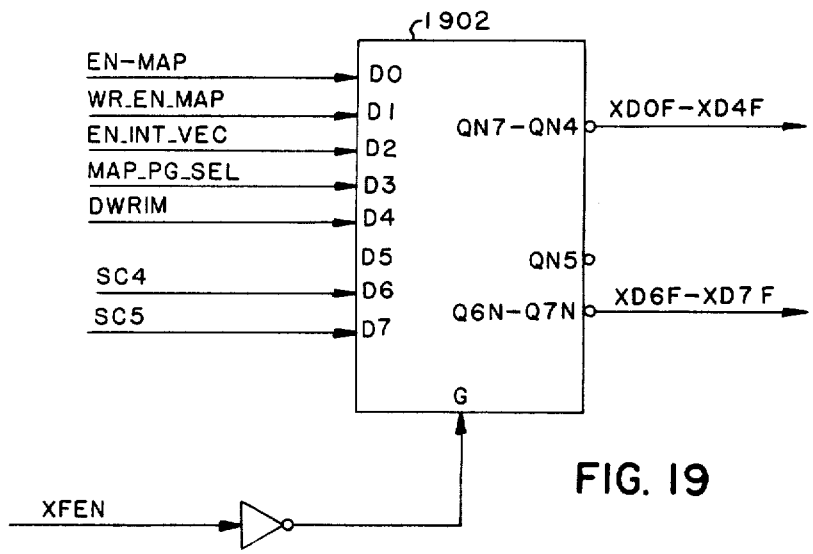
FIG. 19 is a block diagram and schematic representation of a gate for output signals from the control register.

FIG. 17 shows a gate 1702 for gating the low byte of the DMA page register 118 to output data bus 104 when it is read in the I/O address space. FIG. 18 shows a gate 1802 for gating the outputs of the DMA mode control register 114 to the output as signals of the MDA mode control register 114 to the output as signals XD6E-XD0E. Similarly, FIG. 19 shows a gate 1902 for output gating of the control register data as signals XD0F-XD4F and XD6F-XD7F. Note that bit 5 is the interrupt reset bit and it cannot be read.

Figure 20:
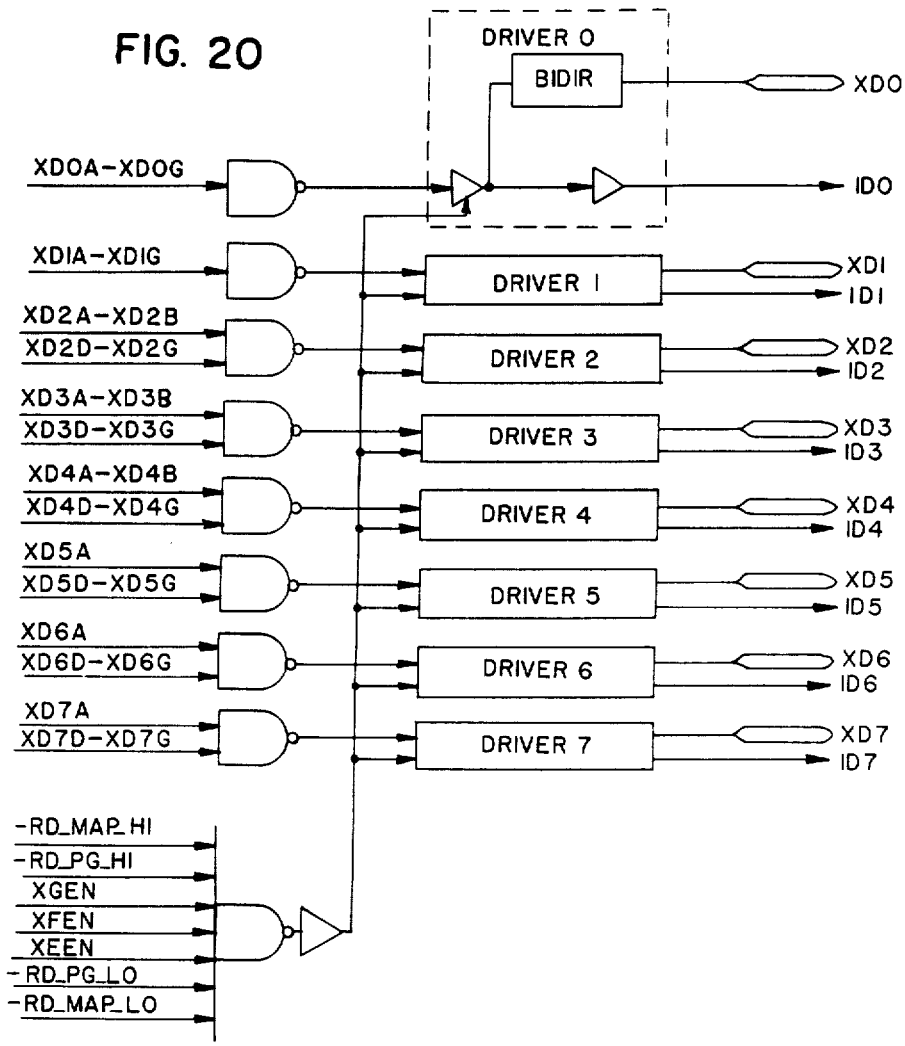
FIG. 20 is a block diagram and schematic representation of a bidirectional data bus interface.

The bidirectional connection to the data bus is shown in FIG. 20. By way of reference, the XD0 terms having an A suffix relate to the mapping ram 112 low bits, B is for the high bits, C is for the page register 118 low bits, D is for high bits, E is for the mode control register 114, F is for control register 108 and the G suffix designates the last instruction address register 124.

Signal INSF is buffered as it is received and redesignated IINSF. Similarly, the input address signals A00-A23 are buffered and redesignated IA00-IA23 as they are received. The X bus input address signals DX14-DX16 are each buffered and redesignated IDX14-IDX16.

For the outputs address signals OXA14-OXA16 are buffered and gated to the XA bus 86 as signals XA14-XA16.

The gated memory read and write signals OXGMR and OXGMW are buffered and gated to their respective outputs as signals XGMR and XGMU. They are gated by $$XG\_GATE = TRIACK \cdot IXMST \quad (27)$$

The translation output address signals OTA17-OTA23 are buffered and gated by signal TRIXMST before being output to the TA address bus as signals TA17-TA23.

Input signals EB0, EB1, DAK4 and XIOR are buffered and redesignated IEB0, IEB1, IDAK4 and IXIOR respectively. Input signals XIOW, XRES, A20G, CLK and AEN1 are buffered and redesignated IXIOW, IXRES, IA20G, ICLK and IAEN1 respectively.

The interrupt related input signals XACK, XNST, NMI, INTA, and MNIO are buffered and redesignated IXACK, IXNST, INMI, IINTA and IM—IO respectively. The memory access input signals MWIN, MRIN and ALE are buffered and redesignated IMWIN, IMRIN and IALE.

Output signals ONP, OEWXB and OTA14-OTA16 are buffered and connected without further gating to their output terminals as signals NP, EMXB and TA14-TA16 respectively.

While there has been shown and described above a particular arrangement of a computer system including an address modification system in accordance with the invention, it will be appreciated that the invention is not limited thereto. Accordingly, any modifications, variations or equivalent arrangements within the scope of the attached claims should be considered to be within the scope of the invention.

What is claimed:

1. A computer address modification system for modification of a portion of a computer address received from a computer system comprising:
   a mapper store having a plurality of addressable storage locations, each of which corresponds to a block of addresses, stores address information representing at least a portion of a translated address for the corresponding block of addresses, and outputs the stored address information in response to a portion of an address received from the computer system that identifies the corresponding block addresses;
   a page store having a plurality of addressable storage locations, each of which corresponds to a direct memory access channel of the computer system, stores address information representing at least a portion of an address for assertion during a direct memory access using the corresponding direct memory access channel, and outputs the stored address information in response to an occurrence of a direct memory access on the corresponding channel;
   a control circuit receiving a portion of the received computer address sufficient to identify a block of addresses within a plurality of blocks of addresses, receiving from the computer system signals indicating an occurrence of a direct memory access and the channel on which a direct memory access occurs, receiving from the computer system a page store enable signal that is selectively in an active or inactive state and independent of any address location indicated by the received computer address, and receiving stored address information output from the page store;
   the control circuit being operative to output system address data representing at least a portion of a computer address as a substitute for the received address portion, the system address data being, when a direct memory access channel is active and the page store enable signal has an active state, the output from the page store storage location corresponding to the active channel, and when the direct memory access channel is inactive the output from a mapper store location corresponding to a block of addresses indicated by the received computer address portion.

2. A computer address modification system according to claim 1, further comprising a control register providing storage for at least one control state defined by information received from the computer system, one of the control states being a translation enable state, the control circuit including a circuit blocking substitution of a translated address portion stored in the mapper store for the received address portion unless the stored translation enable state indicates that translation is enabled.

3. A computer address modification system according to claim 1 further comprising a DMA mode register having storage for a plurality of enable signals received from the computer system, each corresponding to a different direct memory access channel, the control circuit including a circuit responsive to the DMA mode register to disable substitution of an address portion stored in the page store for a DMA address portion unless the stored enable signal corresponding to an active channel indicates that the substitution is enabled.

4. A computer address modification system receiving and selectively modifying a portion of an address from a computer system comprising:
   a page store having a plurality of addressable storage locations corresponding to each of a plurality of different direct memory access channels with one of the storage locations corresponding to each channel being a first storage location;
   a DMA mode register storing for each channel a channel enable signal received from the computer system;
   and a control circuit responsive to a page register enable signal received from the counter system, to the received portion of an address and to the DMA mode register to control selective modification of the portions of received addresses, the control circuit commanding operation in an extended mode when the page register enable signal is active and a direct memory access channel is active while the corresponding channel enable signal for the active channel stored by the DMA mode register has an active state by providing as a portion of the computer address signals, data stored in one of the addressable page store storage locations which corresponds to the active channel with the one addressable storage location being selected in response to at least a portion of the received computer address signals; and
   the control circuit inhibiting the providing of data stored in the page store as a portion of the computer address signals when the page register enable signal is inactive, when the channel enable signal corresponding to the current DMA channel has an inactive state and when no direct memory access channel is active.

5. A computer address modification system according to claim 4, wherein the provided data is substituted for at least the portion of the computer address signal which the control circuit responds to in selecting the one addressable storage location.

6. A computer address modification system according to claim 4 wherein the control circuit is responsive to an active state of the page register enable signal and an inactive state of a stored channel enable signal for an active channel by commanding operation in a special clone mode by providing as a portion of the computer address signals, data stored in the first of the plurality of addressable page storage locations which corresponds to the active channel.

7. A computer address modification system according to claim 4 further comprising:
   a mapping store storing a plurality of computer address portions for substitution in place of at least a portion of a computer address;
   a control store storing a mapping store enable signal; and
   the control circuit responding to an inactive state of the page register enable signal and an active state of the mapping store enable signal by commanding operation in a mapped clone mode by providing as a portion of the computer address signals one of the computer address portions stored in the mapping store with the one portion being selected in response to a portion of the received computer address signals.

8. A computer address modification system according to claim 7 wherein the control circuit responds to an inactive state of the page register enable signal by disabling substitution of data stored in the page store for the received portion of a computer address without disabling substitution of data stored in the mapping store for the received portion of a computer address.

9. A computer address modification system according to claim 7 wherein the control circuit responds to an inactive state of the stored mapping store enable signal by disabling any substitution of data stored in the mapping store for any portion of a computer address.

10. A computer address modification system receiving and selectively modifying address data from a computer system, the address modification system comprising:
- a page store having a plurality of addressable storage locations storing computer address data, each storage location corresponding to one of a plurality of different direct memory access channels with one of the storage locations corresponding to each channel being a first storage location;
- a DMA mode register storing and providing as an output a channel enable signal selectively enabling paging for each DMA channel;
- a mapping store storing a plurality of storage locations, each storing computer address data for substitution in place of the received computer address data;
- control store storing and providing as an output a mapping store enable signal; and
- a control circuit responsive to the states of the channel enable signals, the mapping store enable signal and a page store enable signal received from a computer system to command operation in a selected one of a plurality of modes including (1) when the page store enable signal is active and a DMA channel activity signal indicates operation of a given DMA channel while the corresponding stored channel enable signal has an active state, an extended mode in which computer address data stored in the page store at one of the storage locations is provided as an output for use in forming at least a portion of a computer address, the storage location being selected from among the storage locations corresponding to the active channel in response to the received computer address data; (2) when the page store enable signal is active and a DMA channel activity signal indicates operation of a given DMA channel while the corresponding stored channel enable signal has an inactive state, a special clone mode in which the computer address data stored in the page store at the first storage location corresponding to the active DMA channel is provided as an output for use in forming at least a portion of a computer address, (3) when the page store enable signal is inactive and the stored mapping store enable signal has an active state, a mapped clone mode in which computer address data stored in a mapping store storage location selected in response to the received computer address data is provided for use in forming at least a portion of a computer address, and (4) when the page store enable signal is inactive and the stored mapping store enable signal has an inactive state, a clone mode in which the received computer address data is output unchanged for use in forming at least a portion of a computer address.

11. A computer address modification system according to claim 10 wherein the control store stores a mapping redirection signal having a state which is either a redirection state or a nonredirection state, wherein the control circuit includes an interrupt processing detection circuit receiving signals indicating when an interrupt request is being responded to and generating an interrupt detected signal when a response to an interrupt request is indicated while the control store stores an interrupt redirection signal having a redirection state and wherein the control circuit operates when the interrupt detected signal is active while the stored interrupt redirection signal has a redirection state to inhibit providing address data stored in the mapping store as the output for use in forming at least a portion of a computer address.

12. A computer address modification system according to claim 11 wherein the control store has an address in a second address space that is distinguishable from the computer addresses and wherein the interrupt processing detection circuit responds to writing by the computer system of a selected state to a predetermined location within the control store using the address of the control store in the second address space by resetting the interrupt redirection signal to an inactive state.

13. A computer modification system for use with a computer system having first and second address spaces, the first address space having low, medium, high and extended address signal portions in respective order of significance, having DMA signals indicating DMA channel activity in the first address space and a circuit generating a page store enable signal selectively defining active and inactive states thereof, comprising:
- a mapping store having a plurality of storage locations, each storage location storing a translation address having medium, high and extended address portions for a contiguous block of first address space addresses;
- a writeable control store that is addressable in the second address space and includes at least one storage location including a mapping store unable location storing data defining a mapping store enable signal having selectable enable and disable states;
- a page store having a plurality of storage locations, each storage location storing a paging address having medium, high and extended address portions for a contiguous block of first address space addresses, the page store having a plurality of storage locations corresponding to each DMA channel among a plurality of DMA channels with one of each plurality of storage locations being a first storage location;
- a writeable DMA mode store that is addressable in the second address space and stores a channel enable signal defining a DMA paging channel enable state for each of a plurality of direct memory access channels; and
- a control circuit controlling system operation in one of a plurality of modes including a clone mode and an extended mode,
  (1) the control circuit operating in clone mode when the page store enable signal defines an inactive state and the stored mapping store enable signal has a disable state to provide as an output medium, high and extended address signal portions that are the same as received medium, high and extended address signal portions,
  (2) the control circuit operating in mapped clone mode when the page store enable signal defines an inactive state and the mapping store enable signal has an enable state to provide as an output medium, high and extended address signal portions stored at a mapping store storage location determined in response to medium and high portions of a received address signal, (3) the control circuit operating in special clone mode when the page store enable signal defines an active state, while the received DMA signals indicate that a DMA channel is active and the stored channel enable signal for the active channel has a state disabling paging to provide as an output medium, high and extended address signal portions stored at the first storage location among the plurality of storage locations corresponding to the active channel, and (4) the control circuit operating in extended mode when the page store enable signal defines an active state while the received DMA signals indicate that a DMA channel is active and the stored channel enable signal for the active channel has a state enabling paging to provide as an output medium, high and extended address signal portions stored at a storage location among the plurality of storage locations corresponding to the active channel that is selected in response to the medium portion of a received address signal.

14. A computer address modification system according to claim 13 wherein the control circuit fails to provide as an output any address signal portion when the mapping store enable signal has an enable state and an extended portion of a received address signal has a state other than a predetermined state.

15. A computer address modification system according to claim 13 wherein the lower address portion of an address received from the computer system in the first address space defines a location within a 16K block of addresses where K equals 1024.

16. A computer address modification system according to claim 13 wherein the control store stores information defining an interrupt redirection signal and the control circuit includes means for detecting a response to an interrupt request and providing as an output medium, high and extended portions of addresses received from the computer system in the first address space after a response to an interrupt request is detected when the interrupt redirection signal has an active state.

17. A computer address modification system according to claim 13 wherein the control store stores a write enable signal selectively enabling writing of the mapping store and wherein the control store enables write accesses to the mapping store storage locations only when the write enable signal has a write enable state.

18. A computer address modification system according to claim 13 wherein the control store stores an extended address disable signal and the control circuit responds to an active state of the extended address disable signal by not providing any address portion as an output in response to an address signal received from the computer system having an extended portion having other than a given predetermined state.

19. A computer address modification system according to claim 18 wherein the given predetermined state of the extended portion of a received address is all zeros.

20. A computer address modification system according to claim 13 wherein the mapping store includes multiple sets of the plurality of storage locations with only one set being operative to provide translation address data at any given time, and wherein the control store stores data defining which set is active at any given time.

* * * * *

UNITED STATES PATENT AND TRADEMARK OFFICE
CERTIFICATE OF CORRECTION

PATENT NO. : 4,849,875

DATED : July 18, 1989

INVENTOR(S) : Bruce A. Fairman et al.

It is certified that error appears in the above-identified patent and that said Letters Patent is hereby corrected as shown below:

Column 1, line 49, "16 segment" should read --16 bit segment--.

Column 13, line 39, "made" should read --mode--.

Column 14, line 12, before "is connected" insert --and its reset input connected to signal -EN_MAP. The gate input--.

Column 19, line 27, before "control store" insert --a--.

Column 20, line 38, "unable" should read --enable--.

Signed and Sealed this

Seventeenth Day of July, 1990

Attest:

HARRY F. MANBECK, JR.

Attesting Officer      Commissioner of Patents and Trademarks